(No Model.)
J. RIDENOUR.
STRAW CARRIER.
No. 278,457. Patented May 29, 1883.
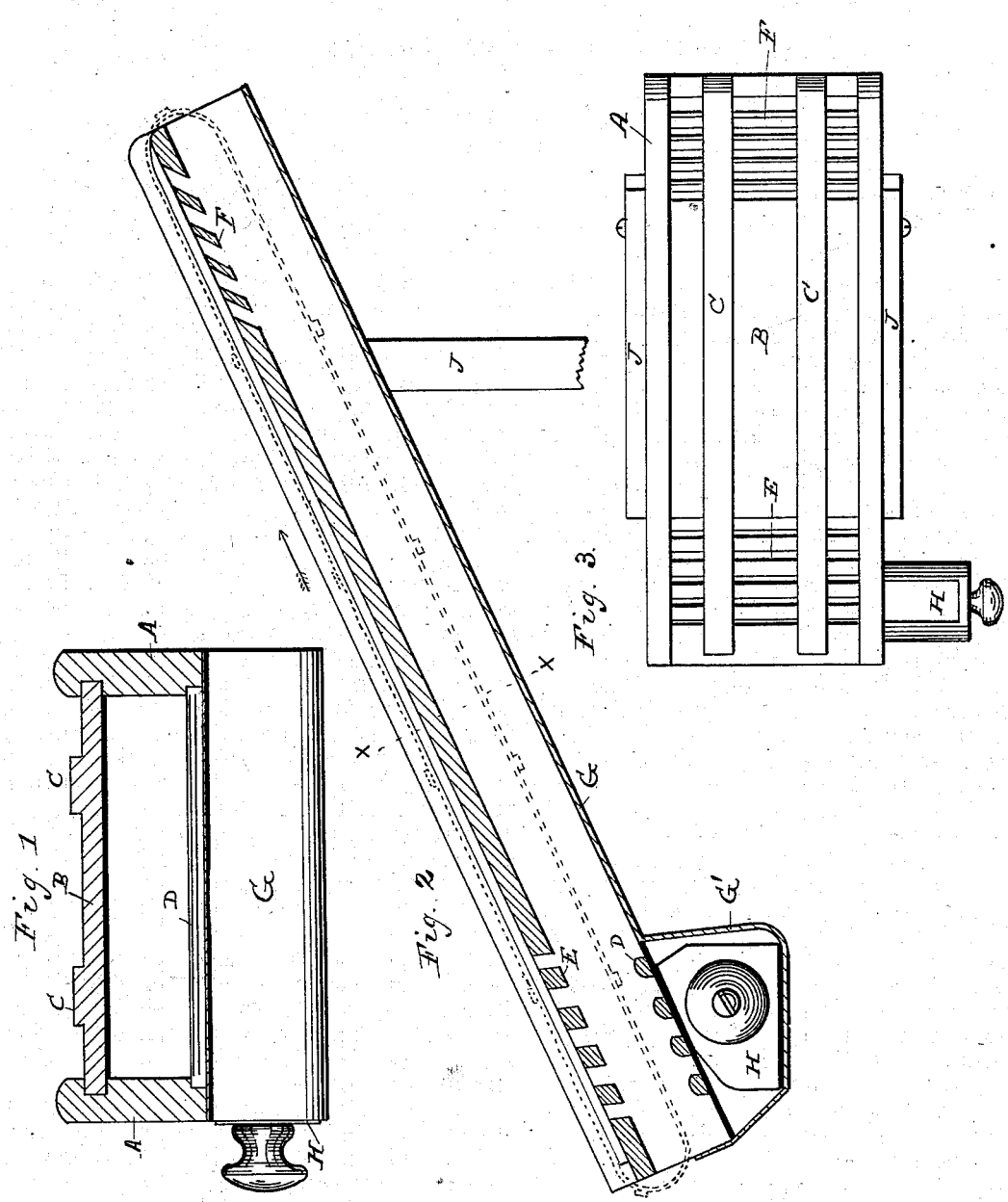

United States Patent Office.

JOHN RIDENOUR, OF MOUNT VERNON, INDIANA.

STRAW-CARRIER.

SPECIFICATION forming part of Letters Patent No. 278,457, dated May 29, 1883.

Application filed March 7, 1883. (No model.)

*To all whom it may concern:*

Be it known that I, JOHN RIDENOUR, a citizen of the United States, residing at Mount Vernon, in the county of Posey and State of Indiana, have invented certain new and useful Improvements in Straw-Carriers, of which the following is a specification, reference being had therein to the accompanying drawings.

My invention relates to improvements in straw-carriers, and has for its object the saving of grain which may be in the straw while being carried to the straw-stack. This object is attained by the mechanism illustrated in the accompanying drawings, forming a part of this specification, in which—

Figure 1 is a transverse section on the line $x$ $x$ of Fig. 2. Fig. 2 is a longitudinal vertical section, and Fig. 3 a plan view.

The letter A represents the sides of an inclined case, and B the top thereof, having two slightly-elevated ridges, C.

G is the bottom.

G' is a receptacle for the drawer H.

E are inclined slats having open spaces between them for the passage of the grain, and are placed transversely near the lower end of the case.

F are inclined transverse slats near the upper end of the case, and D are transverse slats placed over the receptacle G', slightly elevated above the bottom G of the case.

The dotted lines indicate the carrier, of the usual form, composed of two or more narrow belts having transverse battens or slats attached to them.

As the straw is discharged from the thrasher onto the lower part of the case, any loose grain contained therein will fall through the open spaces between the slats E, or through the spaces between the slats F, and thence down the inclined bottom G, between the slats D, into the drawer H, which may be removed from time to time and emptied, the straw being carried by the belts and battens over the upper end of the case to the straw-stack. The belts move in the direction of the arrow. The bars D are slightly elevated above the surface of the bottom G, in order that any bunches of straw containing grain that may go over with the belt may be struck and agitated by the bars D, and the grain be separated therefrom and fall through the openings between the bars into the drawer H below, as the sagging of the belt will cause the slats thereof to approach very nearly, or even touch, the rounded upper surface of the bars D, and cause a jarring motion to be imparted to the belt and have a tendency to shake out and to separate the grain and straw from each other. The ridges C, by lifting the battens and belt a little above the surface of the top of the case B, will not only cause the grain and straw to be separated more easily, the grain escaping down the floor B under the battens or slats, but also reduce the friction and the wear and tear of the belt.

Having described my invention, what I desire to secure by Letters Patent and to claim is—

1. The combination of the endless carrier, the side bars, A, the floor B, the slats E F, the bottom G, the transverse bars D, having rounded upper faces projecting above the plane of the bottom G, and the receptacle G', substantially as set forth.

2. The combination of the endless slatted carrier, the side bars, A, the floor B, the slats E F, the ridges C, the bottom G, and the receptacle G', substantially as set forth.

In testimony whereof I affix my signature in presence of two witnesses.

JOHN RIDENOUR.

Witnesses:
J. B. TATE,
MARK T. LEONARD.